(12) United States Patent
Lee et al.

(10) Patent No.: US 11,466,886 B2
(45) Date of Patent: Oct. 11, 2022

(54) ARTIFICIAL INTELLIGENCE DEVICE AND ARTIFICIAL INTELLIGENCE SYSTEM FOR MANAGING INDOOR AIR CONDITION

(71) Applicant: LG ELECTRONICS INC., Seoul (KR)

(72) Inventors: Yongha Lee, Seoul (KR); Jungmin Park, Seoul (KR); Hyejeong Gu, Seoul (KR); Hyunho Oh, Seoul (KR); Eunjoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 516 days.

(21) Appl. No.: 16/567,666

(22) Filed: Sep. 11, 2019

(65) Prior Publication Data

US 2020/0003447 A1   Jan. 2, 2020

Related U.S. Application Data

(60) Provisional application No. 62/730,009, filed on Sep. 12, 2018.

(30) Foreign Application Priority Data

Sep. 3, 2019   (KR) .......... 10-2019-0108796

(51) Int. Cl.
*F24F 11/49* (2018.01)
*F24F 11/52* (2018.01)
(Continued)

(52) U.S. Cl.
CPC .............. *F24F 11/49* (2018.01); *F24F 11/52* (2018.01); *F24F 11/64* (2018.01); *G06N 3/0427* (2013.01);
(Continued)

(58) Field of Classification Search
CPC . F24F 2110/52; F24F 2110/64; F24F 2203/00
See application file for complete search history.

(56) References Cited

U.S. PATENT DOCUMENTS

2002/0144537 A1* 10/2002 Sharp ................. G01N 33/0075
73/31.07
2006/0234621 A1* 10/2006 Desrochers .............. G01N 1/26
702/50

(Continued)

FOREIGN PATENT DOCUMENTS

EP            3023706 A1    5/2016
KR         10-1591735 B1    2/2016
WO    WO 2017/142346 A1    8/2017

*Primary Examiner* — Nathan L Laughlin
(74) *Attorney, Agent, or Firm* — Birch, Stewart, Kolasch & Birch, LLP

(57) ABSTRACT

An artificial intelligence (AI) device includes a display, a communication unit configured to transmit indoor air quality information received from an air quality measurement device and meta information input through the display to an AI server, and a processor configured to receive an air quality analysis report generated based on outdoor air quality information, the indoor air quality information and the meta information from the AI server through the communication unit and display the received air quality analysis report on the display. The air quality analysis report includes a first analysis report including a result of analyzing an indoor air quality condition during a measurement period of the air quality measurement device, and a second analysis report including an air quality type according to the indoor air quality condition and a solution for fine dust management according to the air quality type.

15 Claims, 17 Drawing Sheets

(51) Int. Cl.
  *F24F 11/64*   (2018.01)
  *G06N 3/04*   (2006.01)
  *G06N 3/08*   (2006.01)
  *F24F 110/64*   (2018.01)
  *F24F 110/50*   (2018.01)
  *F24F 110/20*   (2018.01)
  *F24F 110/72*   (2018.01)
  *F24F 110/52*   (2018.01)

(52) U.S. Cl.
  CPC ............ *G06N 3/08* (2013.01); *F24F 2110/20* (2018.01); *F24F 2110/50* (2018.01); *F24F 2110/52* (2018.01); *F24F 2110/64* (2018.01); *F24F 2110/72* (2018.01); *F24F 2203/00* (2013.01)

(56)  References Cited

U.S. PATENT DOCUMENTS

| | | |
|---|---|---|
| 2013/0174646 A1 | 7/2013 | Martin |
| 2015/0032264 A1* | 1/2015 | Emmons .............. F24F 11/0001 700/276 |
| 2015/0154850 A1 | 6/2015 | Fadell et al. |
| 2016/0125307 A1* | 5/2016 | Zheng .................... G06N 7/005 706/20 |
| 2017/0193788 A1* | 7/2017 | Kim ....................... G08B 21/12 |
| 2019/0056138 A1 | 2/2019 | Lee et al. |
| 2019/0381443 A1* | 12/2019 | Kim ......................... F24F 11/56 |
| 2020/0003437 A1* | 1/2020 | Breen .................. A61B 5/7275 |

\* cited by examiner

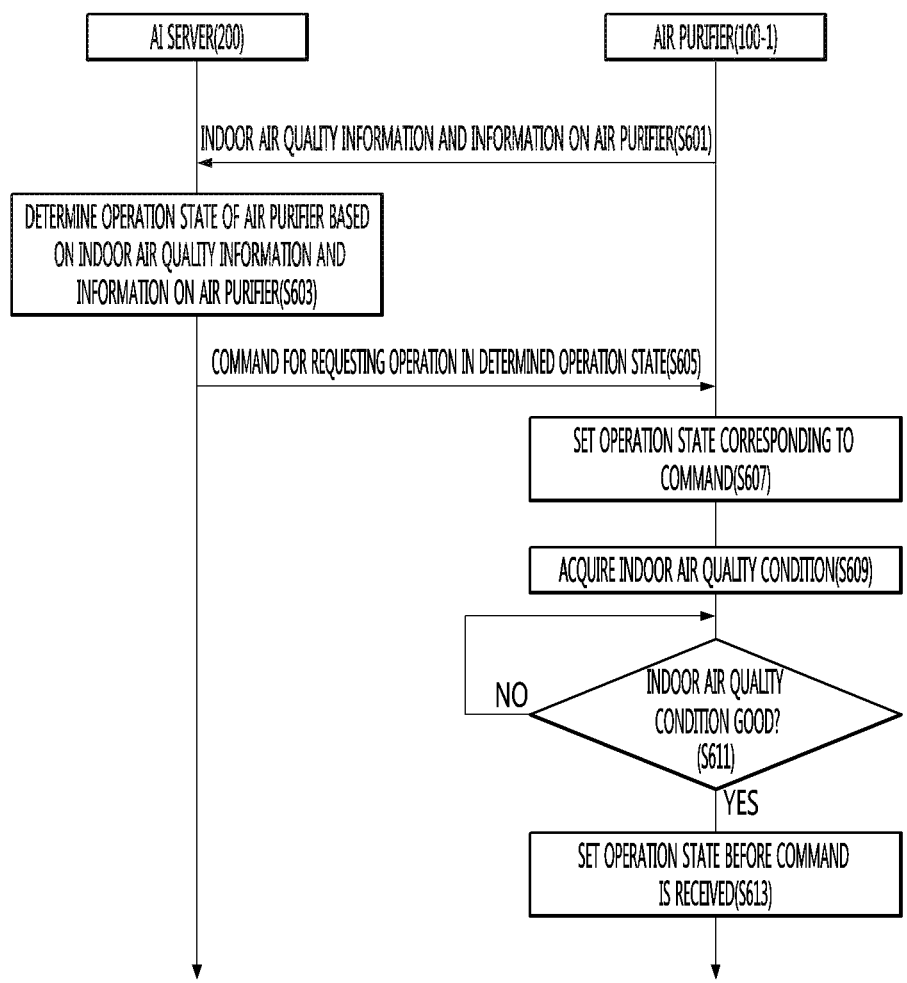

FIG. 7A

| DUST SENSOR DETECTION (PM 1.0, PM 2.5) | MONTBLAC B | MONTBLAC D (28 PYEONG) | MONTBLAC D (18 PYEONG) | MONTBLAC D (25 PYEONG) | MONTBLAC D (16 PYEONG) | MONTBLANC P | MONTBLANC S |
|---|---|---|---|---|---|---|---|
| VERY BAD | UPWARD-AND-DOWNWARD ROTATION: ON LEFT-AND-RIGHT ROTATION: ON AIR VOLUME: STRONG WIND | OPERATION MODE: CLEAN BOOSTER LEFT-AND-RIGHT ROTATION: ON AIR VOLUME: POWER | OPERATION MODE: CLEAN BOOSTER LEFT-AND-RIGHT ROTATION: ON AIR VOLUME: POWER | OPERATION MODE: DUAL PURITY AIR VOLUME: POWER | AIR VOLUME: POWER | OPERATION MODE: RAPID PURITY | AIR VOLUME: POWER |
| BAD | UPWARD-AND-DOWNWARD ROTATION: OFF LEFT-AND-RIGHT ROTATION: OFF AIR VOLUME: MIDDLE WIND | OPERATION MODE: CLEAN BOOSTER LEFT-AND-RIGHT ROTATION: OFF AIR VOLUME: STRONG WIND | OPERATION MODE: CLEAN BOOSTER LEFT-AND-RIGHT ROTATION: OFF AIR VOLUME: STRONG WIND | OPERATION MODE: DUAL PURITY AIR VOLUME: STRONG WIND | AIR VOLUME: STRONG WIND | AIR VOLUME: STRONG WIND | AIR VOLUME: STRONG WIND |

1010 — [Bar charts: Apartment / Home located far from road — "My home's air is worse"; Ultrafine dust concentration (unit: μg/m³); Neighboring home / My home]

1020 — Neighboring home: large room 40, living room 39, small room 38, kitchen 37; My home: living room 54

ANALYSYS RESULT

1030 — Your home has a higher concentration of ultrafine dust than apartments, so we encourage you to take care of it. Compared to homes located far from the road, your home has a higher concentration of fine dust, so we encourage you to take care of it. As a result of analyzing the data of other homes, the concentration of ultrafine dust decreases in order of a large room, a living room, a small room, and a kitchen. Your living room has a higher concentration of ultrafine dust than the living rooms of other homes. Why not pay more attention to indoor air management?

◇ Air quality type and overall opinion of ○○○'s home

1040 — [Quadrant chart: Bad outdoors / Good outdoors vs Good indoor / Bad indoors; evacuation to home 22%, dilemma 25%, pleasant environment 22%, evacuation to the outside 31%]

1050 — Overall opinion

○○○'s home is of a type of evacuation to the outside, in which the concentration of the outdoor fine dust is low but the concentration of the indoor fine dust is high. Indoor air management is necessary for the health of your family.

◇ Solution suitable for ○○○'s home

1060 —
Grow plants. We recommend excellent Tillandsia, coral water and rubber trees with air cleaning effect Drink plenty of water. It protects the respiratory mucosa and washes away any impurities that get inside your body.

Pay more attention when cooking When cooking, please turn on the extractor hood and do not forget to clean the vent.

Please do ventilation like this
The US Environmental Protection Agency emphasizes the importance of ventilation, saying that indoor air pollution can increase up to 100 times greater than outdoors if not properly ventilated. Please check the condition of the outside air quality for ventilation.
Take advantage of the smartphone app.
When the outdoor air is bad, opening windows to ventilate can be more harmful. Take advantage of the smartphone app that tells the fine dust information.
Take advantage of an air purifier
Air purifiers are useful for air management when both indoor and outdoor air is bad. We recommend the PuriCare 360-degree Air Purifier in ○○○'s home. If you are interested in consulting about LG air purifier rental service benefits and promotions, please contact your manager.

FIG. 11

→Dilemma

OOO's home is of a type of dilemma. Since both the indoor and outdoor fine dust concentrations are high, windows cannot be opened or closed. Indoor air management is essential for your family's health.

→Evacuation to home

OOO's home is of a type of evacuation to the inside of the house. Indoor air is well maintained, but the outdoor fine dust concentration is high. Care should be taken when ventilating through windows for your family's health →Evacuation to the outside OOO's home is of a type of evacuation to the outside. The outdoor fine dust concentration is low, but the indoor fine dust concentration is high. Indoor air management is necessary for your family's health →Pleasant environment OOO's home is of a type of pleasant environment. Indoor air is maintained well and the outdoor fine dust concentration is low. For your family's health, keep an eye on indoor air care as you are now

FIG. 12

FIG. 13
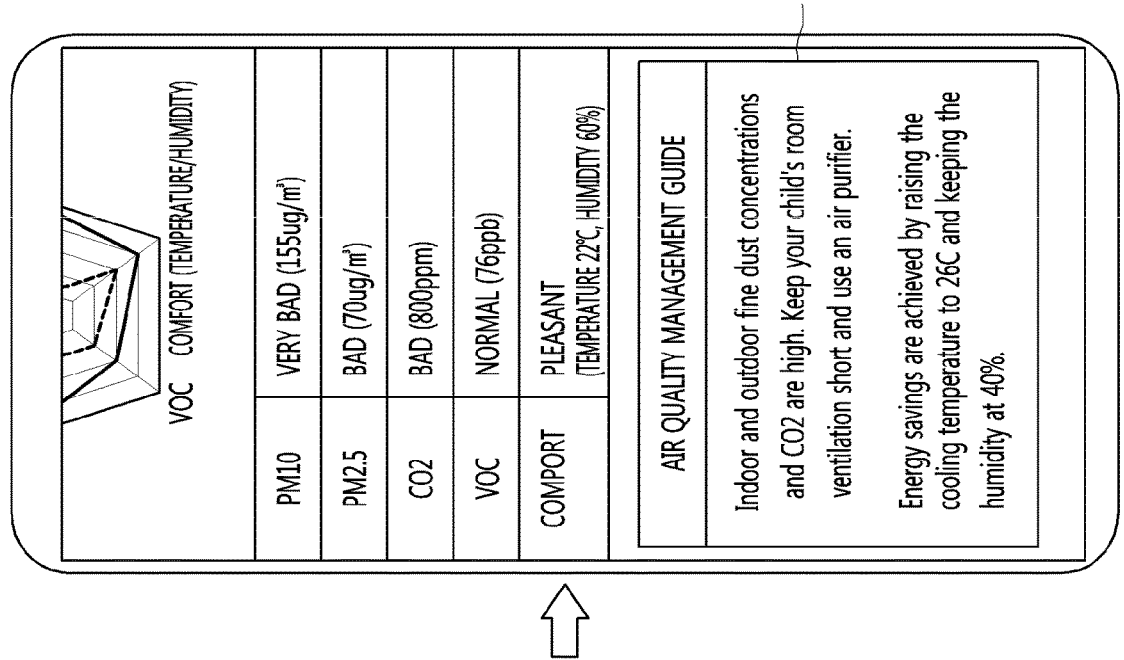
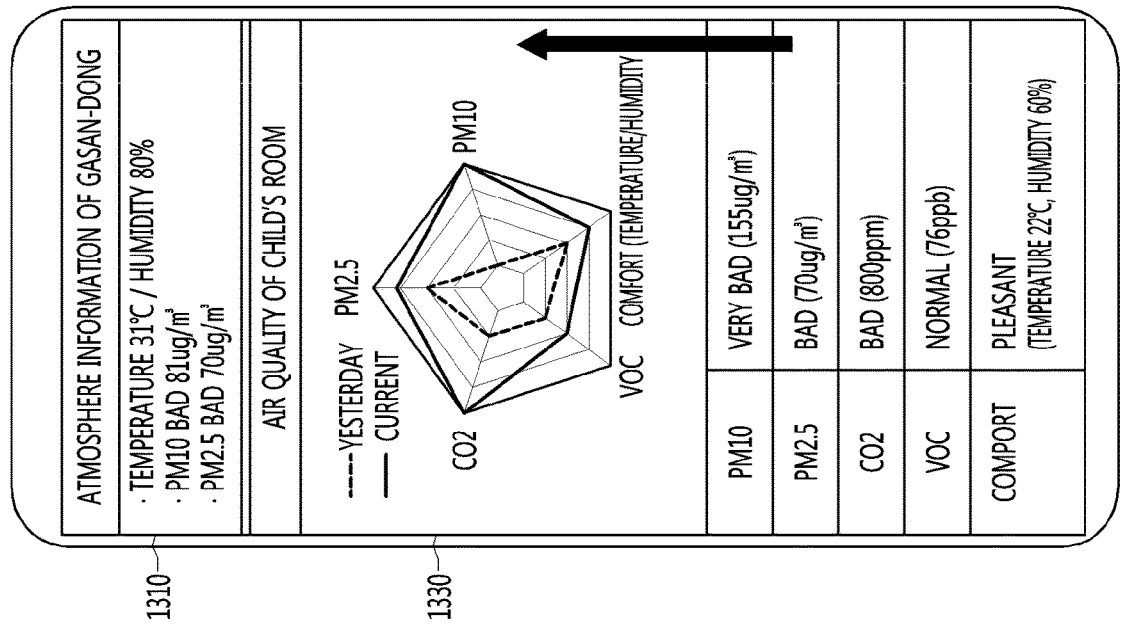

| | | 0 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| OUTDOORS | DUST | GOOD | - | BAD↑ | - | BAD↑ | - | BAD↑ | - | BAD↑ | - | BAD↑ | - | BAD↑ | - | BAD↑ | - | BAD↑ |
| INDOORS | DUST | GOOD | - | - | BAD↑ | BAD↑ | - | - | BAD↑ | BAD↑ | - | - | - | BAD↑ | - | - | BAD↑ | BAD↑ |
| | CO2 | GOOD | - | - | - | - | BAD↑ | BAD↑ | BAD↑ | BAD↑ | - | - | BAD↑ | - | BAD↑ | BAD↑ | BAD↑ | BAD↑ |
| | VOC | GOOD | - | - | - | - | - | - | - | - | BAD↑ | BAD↑ | BAD↑ | BAD↑ | BAD↑ | BAD↑ | BAD↑ | BAD↑ |
| GUIDE | | Air quality is best | Air quality is well managed | Do not ventilate because the outdoor dust concentration is high. | The indoor fine dust concentration is high. Dust can be produced by cooking or moving. Ventilate or use an air purifier. | Ventilation is difficult. Please use an air purifier. | Please ventilate often. | The outdoor dust is high, so keep the ventilation short and turn on the air purifier after the ventilation. | The concentrations of CO2 and dust are high, so please use a combination of ventilation and air purifier. | Indoor and outdoor fine dust and CO2 is high. Keep your child's ventilation short and use an air purifier. | VOC is high. Please ventilate often and VOC can be generated in furniture, interiors, wallpaper, and electronics. | VOC is high but ventilation is difficult. Please keep the ventilation short and use an air purifier with a VOC removal filter. | Indoor dust and VOC are high. Ventilate frequently and use an air purifier with a fine dust filter and a VOC removal filter. | Please keep the ventilation short and use an air purifier with a fine dust filter and a VOC removal filter. | CO2 and VOC are high. Ventilate frequently. | Please keep the ventilation short and use an air purifier with a VOC removal filter. | Please ventilate often and use an air purifier with a complex filter. | The air quality is very bad. Keep ventilation short and use an air purifier with a complex filter. |

FIG. 15B

| | TEMPERATURE(°C) | RELATIVE HUMIDITY(%) | GUIDE | |
| --- | --- | --- | --- | --- |
| | | | SUMMER JUNE TO OCTOBER | WINTER NOVEMBER TO MAY |
| pleasant | 23 ~ 27 | 40 ~ 60 | Energy savings can be achieved by increasing the cooling temperature to 26°C and keeping the humidity at 40%. | Energy savings can be achieved by decreasing the heating temperature to 24°C or less and keeping the humidity at 60% or more. |
| Slightly pleasant | 27 ~ 29 | 30 ~ 70 | | |
| | 27 ~ 29 | | | |
| | 23 ~ 27 | 30 ~ 40 | Save energy by keeping the cooling temperature at 26°C | Increasing the humidity will reduce cold experienced |
| | | 60 ~ 70 | The humidity is high. Use a dehumidifier to reduce the humidity. Beware of diseases such as bacteria. | Keep the humidity by ventilating often |
| Unpleasant high-humidity | 18 ~ 29 | 70 ~ 100 | Use a dehumidifier to reduce the humidity. Beware of diseases such as bacteria. | Keep the humidity by decreasing the temperature and ventilating often. |
| Unpleasant low-humidity | 18 ~ 29 | 0 ~ 30 | Save energy by keeping the cooling temperature at 26°C Beware viruses such as cold. | Humidification is required. Increase the humidity and lower the heating temperature 24°C or less. |
| High temperature | 29 ~ ↑ | - | Use the air conditioner. Be aware of heat disorders and drink plenty of water | Save energy by decreasing the temperature |
| Low temperature | ~ 18 ↓ | - | Save energy by checking whether cooling is excessive | Increase the temperature |

1530

ARTIFICIAL INTELLIGENCE DEVICE AND ARTIFICIAL INTELLIGENCE SYSTEM FOR MANAGING INDOOR AIR CONDITION

CROSS-REFERENCE TO RELATED APPLICATIONS

This Application claims the priority benefit under 35 U.S.C. § 119(e) to U.S. Provisional Application No. 62/730,009 filed on Sep. 12, 2018, and under 35 U.S.C. § 119(a) to Korean Patent Application No. 10-2019-0108796 filed in the Republic of Korea on Sep. 3, 2019, all of which are hereby expressly incorporated by reference into the present application.

BACKGROUND OF THE INVENTION

Field of the Invention

The present invention relates to an artificial intelligence (AI) device for managing an indoor air condition.

Discussion of the Related Art

In general, when a person works for a long time when a building is not ventilated well, CO2 and fine dust increase and thus a room cannot be maintained in a comfortable condition. Therefore, it is necessary to ventilate the room.

To this end, conventionally, a user opened windows after manually turning off an air conditioner or an air purifier, in order to ventilate the room. In addition, recently, a service for measuring and providing an indoor air quality condition has been introduced. However, conventionally, only the value the concentration of fine dust in a room and the state according to the value of the concentration of fine dust are shown.

SUMMARY OF THE INVENTION

An object of the present invention is to provide more detailed information on an indoor air quality condition and manage indoor air quality.

Another object of the present invention is to improve an indoor air quality condition.

An artificial intelligence (AI) device according to an embodiment of the present invention displays an air quality analysis report generated based on outdoor air quality information, indoor air quality information and meta information. The air quality analysis report includes a first analysis report including a result of analyzing an indoor air quality condition during a measurement period of the air quality measurement device, and a second analysis report including an air quality type according to the indoor air quality condition and a solution for fine dust management according to the air quality type.

An artificial intelligence (AI) system according to another embodiment of the present invention includes an air quality measurement device configured to measure indoor air quality information, an AI device configured to acquire meta information, and an AI server configured to receive the indoor air quality information from the air quality measurement device, receive the meta information from the AI device, generate an air quality analysis report based on outdoor air quality information, the indoor air quality information and the meta information, and transmit the generated air quality analysis report to the AI device. The air quality analysis report includes a first analysis report including a result of analyzing an indoor air quality condition during a measurement period of the air quality measurement device, and a second analysis report including an air quality type according to the indoor air quality condition and a solution for fine dust management according to the air quality type.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 6 is a ladder diagram illustrating a method of operating an artificial intelligence system according to an embodiment of the present invention.

FIG. 7A is a table illustrating an operation state of an air purifier being mapped according to an air quality condition and the type of the air purifier according to an embodiment of the present invention.

FIGS. 9 and 10 are views illustrating air quality analysis reports according to an embodiment of the present invention.

FIG. 11 is a view illustrating text provided in correspondence with each of a plurality of air quality types according to an embodiment of the present invention.

FIG. 12 is a view showing a process of receiving meta information of a client necessary to provide an air quality analysis report according to an embodiment of the present invention.

FIG. 13 is an air quality service screen according to an embodiment of the present invention.

FIG. 14 is an air quality guide table in which guides are mapped according to air quality according to an embodiment of the present invention.

FIGS. 15A and 15B are views illustrating guides according to a temperature and humidity measured in a house according to an embodiment of the present invention.

DETAILED DESCRIPTION OF THE EMBODIMENTS

Artificial Intelligence (AI)

Figure 1:
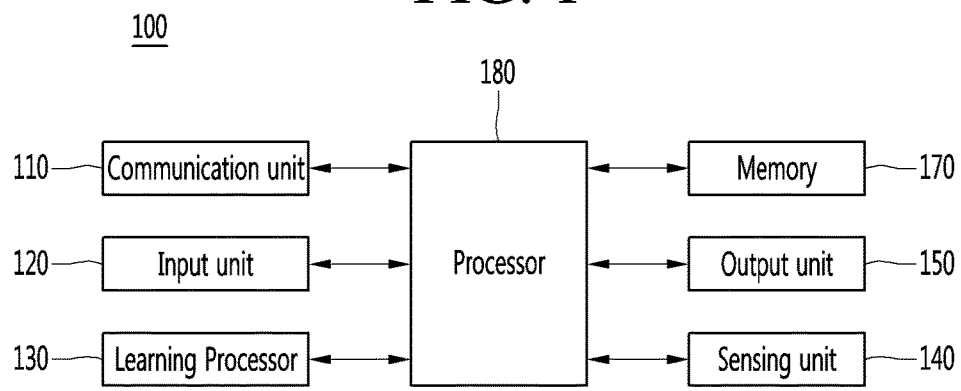
FIG. 1 is a block diagram showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and means a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

Further, the artificial neural network may include an input layer, an output layer, and optionally one or more hidden layers. Each layer includes one or more neurons, and the artificial neural network may include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

Further, the purpose of the learning of the artificial neural network may be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method. The supervised learning refers to a method of learning an artificial neural network when a label for learning data is given, and the label means the correct answer (or result value) that the artificial neural network must infer when the learning data is input to the artificial neural network. Further, the unsupervised learning refers to a method of learning an artificial neural network when a label for learning data is not given. The reinforcement learning refers to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot refers to a machine that automatically processes or operates a given task by its own ability. In particular, a robot having a function of recognizing an environment and performing a self-determination operation can be referred to as an intelligent robot. Robots can also be classified into industrial robots, medical robots, home robots, military robots, and the like according to the use purpose or field.

Further, the robot includes a driving unit having an actuator or a motor and can perform various physical operations such as moving a robot joint. In addition, a movable robot includes a wheel, a brake, a propeller, and the like in a driving unit, and can travel on the ground through the driving unit or fly in the air.

Self-Driving

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle includes a vehicle having only an internal combustion engine, a hybrid vehicle having an internal combustion engine and an electric motor together, and an electric vehicle having only an electric motor, and may include not only an automobile but also a train, a motorcycle, and the like. In addition, the self-driving vehicle can be regarded as a robot having a self-driving function.

eXtended Reality (XR)

Extended reality is collectively referred to as virtual reality (VR), augmented reality (AR), and mixed reality (MR). In more detail, the VR technology provides a real-world object and background only as a CG image, the AR technology provides a virtual CG image on a real object image, and the MR technology is a computer graphic technology that mixes and combines virtual objects into the real world.

Further, the MR technology is similar to the AR technology in that the real object and the virtual object are shown together. However, in the AR technology, the virtual object is used in the form that complements the real object, whereas in the MR technology, the virtual object and the real object are used in an equal manner.

Also, the XR technology can be applied to a head-mount display (HMD), a head-up display (HUD), a mobile phone, a tablet PC, a laptop, a desktop, a TV, a digital signage, and the like. A device to which the XR technology is applied may be referred to as an XR device.

Next, FIG. 1 illustrates an AI device 100 according to an embodiment of the present invention. In addition, the AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180. The communication unit 110 may transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

Further, the input unit 120 can acquire various kinds of data. In addition, the input unit 120 may include a camera for inputting a video signal, a microphone for receiving an audio signal, and a user input unit for receiving information from a user. The camera or the microphone can also be treated as a sensor, and the signal acquired from the camera or the microphone may be referred to as sensing data or sensor information.

Also, the input unit 120 can acquire a learning data for model learning and an input data to be used when an output is acquired by using learning model and can also acquire raw input data. In this instance, the processor 180 or the learning processor 130 can extract an input feature by preprocessing the input data.

Further, the learning processor 130 can learn a model composed of an artificial neural network by using learning data. In more detail, the learned artificial neural network can be referred to as a learning model used to an infer result value for new input data rather than learning data, and the inferred value may be used as a basis for determination to perform a certain operation.

In addition, the learning processor 130 can perform AI processing together with the learning processor 240 of the AI server 200. Also, the learning processor 130 may include a memory integrated or implemented in the AI device 100. Alternatively, the learning processor 130 may be implemented by using the memory 170, an external memory directly connected to the AI device 100, or a memory held in an external device.

Further, the sensing unit 140 can acquire at least one of internal information about the AI device 100, ambient environment information about the AI device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

In addition, the output unit 150 can generate an output related to a visual sense, an auditory sense, or a haptic sense, and may include a display unit for outputting time information, a speaker for outputting auditory information, and a haptic module for outputting haptic information. Further, the memory 170 can store data that supports various functions of the AI device 100. For example, the memory 170 can store input data acquired by the input unit 120, learning data, a learning model, a learning history, and the like.

Also, the processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can request, search, receive, or utilize data of the learning processor 130 or the memory 170. The processor 180 can also control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device. In addition, the processor 180 can acquire intention information for the user input and can determine the user's requirements based on the acquired intention information.

Further, the processor 180 can acquire the intention information corresponding to the user input by using at least one of a speech to text (STT) engine for converting speech input into a text string or a natural language processing (NLP) engine for acquiring intention information of a natural language. At least one of the STT engine or the NLP engine can be configured as an artificial neural network, at least part of which is learned according to the machine learning algorithm. Also, at least one of the STT engine or the NLP engine can be learned by the learning processor 130, can be learned by the learning processor 240 of the AI server 200, or can be learned by their distributed processing.

The processor 180 can also collect history information including the operation contents of the AI apparatus 100 or the user's feedback on the operation and store the collected history information in the memory 170 or the learning processor 130 or transmit the collected history information to the external device such as the AI server 200. The collected history information can then be used to update the learning model.

Further, the processor 180 can control at least part of the components of AI device 100 so as to drive an application program stored in memory 170. Furthermore, the processor 180 can operate two or more of the components included in the AI device 100 in combination so as to drive the application program.

Figure 2:
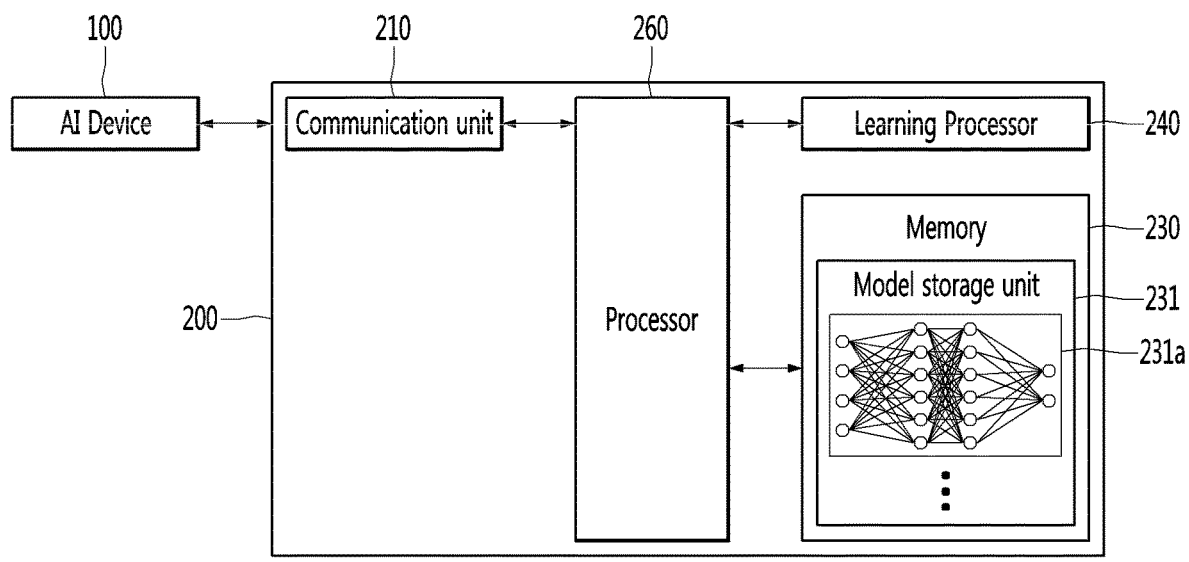
FIG. 2 is a block diagram showing an AI server according to an embodiment of the present invention.

Next, FIG. 2 illustrates an AI server 200 according to an embodiment of the present invention. Referring to FIG. 2, the AI server 200 refers to a device that learns an artificial neural network by using a machine learning algorithm or uses a learned artificial neural network. The AI server 200 may include a plurality of servers to perform distributed processing, or be defined as a 5G network. In addition, the AI server 200 can be included as a partial configuration of the AI device 100, and can perform at least part of the AI processing together.

As shown in FIG. 2, the AI server 200 can include a communication unit 210, a memory 230, a learning processor 240, a processor 260, and the like. The communication unit 210 can transmit and receive data to and from an external device such as the AI device 100. Further, the memory 230 can include a model storage unit 231 storing a learning or learned model (or an artificial neural network 231a) through the learning processor 240.

In addition, the learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can also be implemented in hardware, software, or a combination of hardware and software. If all or part of the learning models are implemented in software, one or more instructions that constitute the learning model can be stored in memory 230. Further, the processor 260 can infer the result value for new input data by using the learning model and can generate a response or a control command based on the inferred result value.

Figure 3:
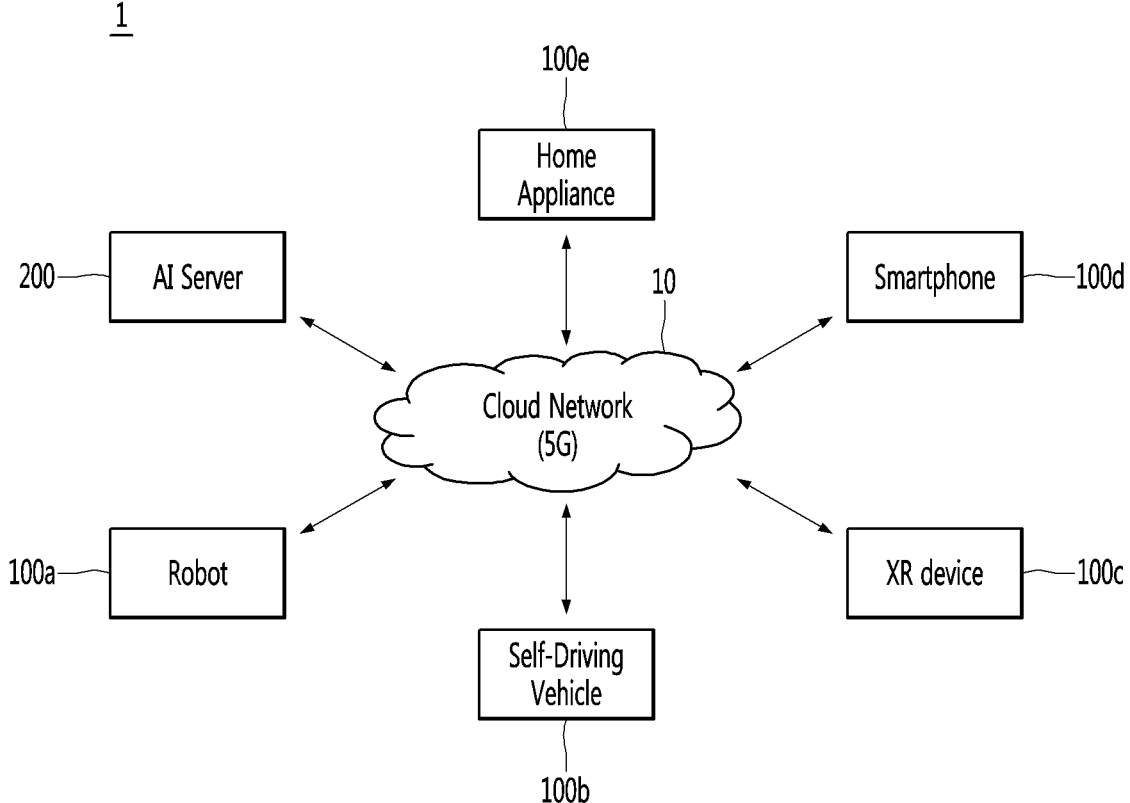
FIG. 3 is an overview showing an AI system according to an embodiment of the present invention.

Next, FIG. 3 illustrates an AI system 1 according to an embodiment of the present invention. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100*b*, the XR device 100*c*, the smartphone 100*d*, or the home appliance 100*e*, to which the AI technology is applied, can be referred to as AI devices 100*a* to 100*e*.

The cloud network 10 refers to a network that forms part of a cloud computing infrastructure or exists in a cloud computing infrastructure. The cloud network 10 can be configured by using a 3G network, a 4G or LTE network, or a 5G network. That is, the devices 100*a* to 100*e* and 200 configuring the AI system 1 can be connected to each other through the cloud network 10. In particular, each of the devices 100*a* to 100*e* and 200 can communicate with each other through a base station, but can directly communicate with each other without using a base station.

Further, the AI server 200 can include a server that performs AI processing and a server that performs operations on big data. The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

In addition, the AI server 200 can learn the artificial neural network according to the machine learning algorithm instead of the AI devices 100*a* to 100*e*, and can directly store the learning model or transmit the learning model to the AI devices 100*a* to 100*e*. In addition, the AI server 200 can receive input data from the AI devices 100*a* to 100*e*, infer the result value for the received input data by using the learning model, generate a response or a control command based on the inferred result value, and transmit the response or the control command to the AI devices 100*a* to 100*e*.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 can be regarded as a specific embodiment of the AI device 100 illustrated in FIG. 1.

AI+Robot

The robot 100*a*, to which the AI technology is applied, can be implemented as a guide robot, a carrying robot, a cleaning robot, a wearable robot, an entertainment robot, a pet robot, an unmanned flying robot, or the like. The robot 100*a* can include a robot control module for controlling the operation, and the robot control module refers to a software module or a chip implementing the software module by hardware.

Further, the robot 100*a* can acquire state information about the robot 100*a* by using sensor information acquired from various kinds of sensors, detect (recognize) surrounding environment and objects, can generate map data, determine the route and the travel plan, can determine the response to user interaction, or determine the operation. The robot 100*a* can use the sensor information acquired from at least one sensor among the lidar, the radar, and the camera so as to determine the travel route and the travel plan. The robot 100*a* can perform the above-described operations by using the learning model composed of at least one artificial neural network. For example, the robot 100*a* can recognize the surrounding environment and the objects by using the learning model, and can determine the operation by using the recognized surrounding information or object information. The learning model can be learned directly from the robot 100*a* or can be learned from an external device such as the AI server 200.

In addition, the robot 100*a* can perform the operation by generating the result by directly using the learning model, but the sensor information can be transmitted to the external device such as the AI server 200 and the generated result can be received to perform the operation. The robot 100*a* can use at least one of the map data, the object information detected from the sensor information, or the object information acquired from the external apparatus to determine the travel route and the travel plan, and can control the driving unit such that the robot 100*a* travels along the determined travel route and travel plan.

Further, the map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/interaction of the user. In addition, the robot 100*a* can acquire the intention information of the interaction due to the user's operation or speech utterance, and determine the response based on the acquired intention information, and can perform the operation.

AI+Self-Driving

The self-driving vehicle 100*b*, to which the AI technology is applied, can be implemented as a mobile robot, a vehicle, an unmanned flying vehicle, or the like. The self-driving vehicle 100*b* can include a self-driving control module for controlling a self-driving function, and the self-driving control module refers to a software module or a chip implementing the software module by hardware. The self-driving control module can be included in the self-driving vehicle 100*b* as a component thereof, but can be implemented with separate hardware and connected to the outside of the self-driving vehicle 100*b*.

Further, the self-driving vehicle 100*b* can acquire state information about the self-driving vehicle 100*b* by using sensor information acquired from various kinds of sensors, can detect (recognize) surrounding environment and objects, generate map data, determine the route and the travel plan, or determine the operation.

Like the robot 100*a*, the self-driving vehicle 100*b* can use the sensor information acquired from at least one sensor among the lidar, the radar, and the camera so as to determine the travel route and the travel plan. In particular, the self-driving vehicle 100*b* can recognize the environment or objects for an area covered by a field of view or an area over a certain distance by receiving the sensor information from external devices, or can receive directly recognized information from the external devices.

Further, the self-driving vehicle 100*b* can perform the above-described operations by using the learning model composed of at least one artificial neural network. For example, the self-driving vehicle 100*b* can recognize the surrounding environment and the objects by using the learning model, and determine the traveling movement line by using the recognized surrounding information or object information. The learning model can also be learned directly from the self-driving vehicle 100*a* or be learned from an external device such as the AI server 200.

In addition, the self-driving vehicle 100b can perform the operation by generating the result by directly using the learning model, but the sensor information can be transmitted to the external device such as the AI server 200 and the generated result can be received to perform the operation. Also, the self-driving vehicle 100b can use at least one of the map data, the object information detected from the sensor information, or the object information acquired from the external apparatus to determine the travel route and the travel plan, and control the driving unit such that the self-driving vehicle 100b travels along the determined travel route and travel plan.

Further, the map data can include object identification information about various objects arranged in the space (for example, road) in which the self-driving vehicle 100b travels. For example, the map data can include object identification information about fixed objects such as street lamps, rocks, and buildings and movable objects such as vehicles and pedestrians. The object identification information can include a name, a type, a distance, and a position.

In addition, the self-driving vehicle 100b can perform the operation or travel by controlling the driving unit based on the control/interaction of the user. For example, the self-driving vehicle 100b can acquire the intention information of the interaction due to the user's operation or speech utterance, determine the response based on the acquired intention information, and perform the operation.

AI+XR

The XR device 100c, to which the AI technology is applied, can be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like. The XR device 100c can analyzes three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

Also, the XR device 100c can perform the above-described operations by using the learning model composed of at least one artificial neural network. For example, the XR device 100c can recognize the real object from the three-dimensional point cloud data or the image data by using the learning model, and provide information corresponding to the recognized real object. The learning model can also be directly learned from the XR device 100c, or be learned from the external device such as the AI server 200.

In addition, the XR device 100c can perform the operation by generating the result by directly using the learning model, but the sensor information can be transmitted to the external device such as the AI server 200 and the generated result can be received to perform the operation.

AI+Robot+Self-Driving

The robot 100a, to which the AI technology and the self-driving technology are applied, can be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself. The robot 100a and the self-driving vehicle 100b having the self-driving function can use a common sensing method so as to determine at least one of the travel route or the travel plan. For example, the robot 100a and the self-driving vehicle 100b having the self-driving function can determine at least one of the travel route or the travel plan by using the information sensed through the lidar, the radar, and the camera.

Further, the robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. In addition, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a can include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, can be implemented as a guide robot, a carrying robot, a cleaning robot, a wearable robot, an entertainment robot, a pet robot, an unmanned flying robot, a drone, or the like. The robot 100a, to which the XR technology is applied, refers to a robot that is subjected to control/interaction in an XR image. In this instance, the robot 100a can be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. The robot 100a can operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, can be implemented as a mobile robot, a vehicle, an unmanned flying vehicle, or the like. The self-driving driving vehicle 100b, to which the XR technology is applied, refers to a self-driving vehicle having a means for providing an XR image or a self-driving vehicle that is subjected to control/interaction in an XR image. Particularly, the self-driving vehicle 100b that is subjected to control/interaction in the XR image can be distinguished from the XR device 100c and interwork with each other.

Further, the self-driving vehicle 100b having the means for providing the XR image can acquire the sensor information from the sensors including the camera and output the generated XR image based on the acquired sensor information. For example, the self-driving vehicle 100b can include an HUD to output an XR image, thereby providing a passenger with a real object or an XR object corresponding to an object in the screen.

In addition, when the XR object is output to the HUD, at least part of the XR object can be outputted so as to overlap the actual object to which the passenger's gaze is directed. When the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, can acquire the sensor information from the sensors including the camera, the self-driving vehicle 100b or the XR device 100c generate the XR image based on the sensor information, and the XR device 100c output the generated XR image. The self-driving vehicle 100b can also operate based on the control signal input through the external device such as the XR device 100c or the user's interaction.

Figure 4:
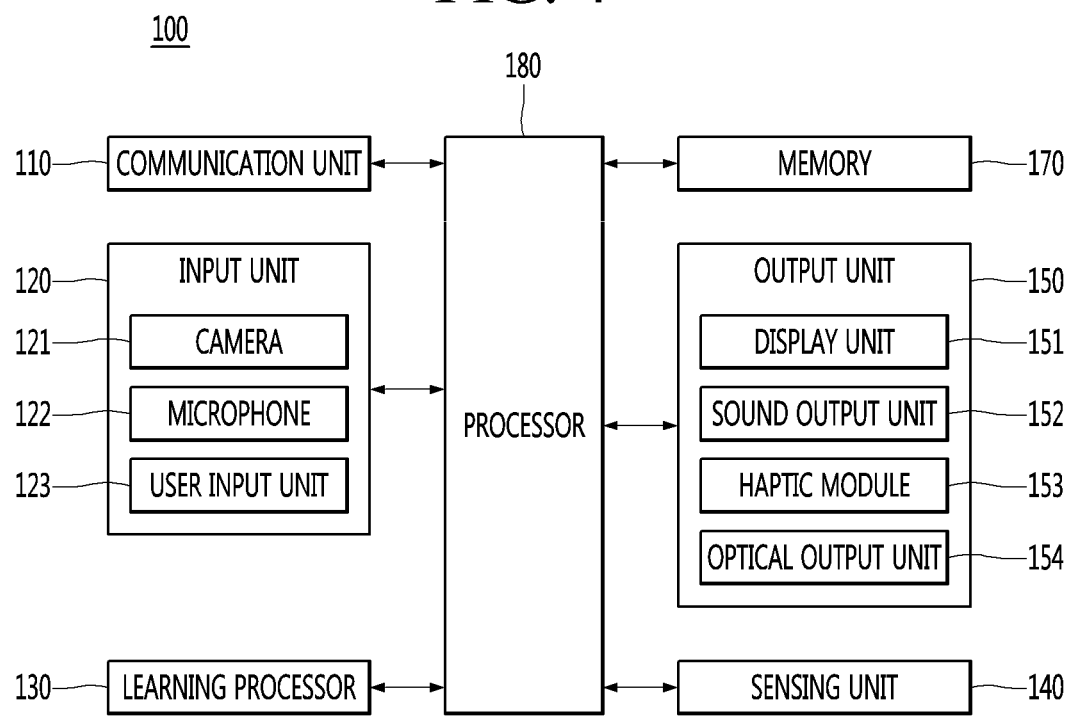
FIG. 4 is a block diagram showing an artificial intelligence (AI) device according to another embodiment of the present invention.

Next, FIG. 4 shows an AI device 100 according to an embodiment of the present invention. A repeated description of FIG. 1 will be omitted. Referring to FIG. 4, an input unit 120 can include a camera 121 for receiving a video signal, a microphone 122 for receiving an audio signal and a user input unit 123 for receiving information from a user.

Audio data or image data collected by the input unit 120 can be analyzed and processed as a control command of the user. Also, the input unit 120 receives video information (or signal), audio information (or signal), data or information received from the user, and the AI device 100 may include one or a plurality of cameras 121 for input of the video information.

Further, the camera 121 processes an image frame such as a still image or a moving image obtained by an image sensor in a video call mode or a shooting mode. The processed image frame can then be displayed on a display unit 151 or stored in a memory 170.

The microphone 122 processes external acoustic signals into electrical sound data. The processed sound data can be variously utilized according to the function (or the application program) performed in the AI device 100. In addition, various noise removal algorithms for removing noise generated in a process of receiving the external acoustic signal is applicable to the microphone 122.

The user input unit 123 receives information from the user. When information is received through the user input unit 123, a processor 180 can control operation of the AI device 100 in correspondence with the input information. Also, the user input unit 123 can include a mechanical input element (or a mechanical key, for example, a button located on a front/rear surface or a side surface of the terminal 100, a dome switch, a jog wheel, a jog switch, and the like) and a touch input element. As one example, the touch input element can be a virtual key, a soft key or a visual key, which is displayed on a touchscreen through software processing, or a touch key located at a portion other than the touchscreen.

As shown, the output unit 150 can include at least one of a display unit 151, a sound output unit 152, a haptic module 153, and an optical output unit 154. The display unit 151 displays (outputs) information processed in the AI device 100. For example, the display unit 151 can display execution screen information of an application program executing at the AI device 100 or user interface (UI) and graphical user interface (GUI) information according to the execution screen information.

In addition, the display unit 151 can have an inter-layered structure or an integrated structure with a touch sensor so as to implement a touchscreen. The touchscreen can also provide an output interface between the terminal 100 and a user, as well as functioning as the user input unit 123 which provides an input interface between the AI device 100 and the user.

Further, the sound output unit 152 can output audio data received from a communication unit 110 or stored in the memory 170 in a call signal reception mode, a call mode, a record mode, a voice recognition mode, a broadcast reception mode, and the like. The sound output unit 152 may include at least one of a receiver, a speaker, a buzzer or the like.

In addition, the haptic module 153 can generate various tactile effects that can be felt by a user. A representative example of tactile effect generated by the haptic module 153 can be vibration. The optical output unit 154 can output a signal indicating event generation using light of a light source of the AI device 100. Examples of events generated in the AI device 100 can include a message reception, a call signal reception, a missed call, an alarm, a schedule notice, an email reception, an information reception through an application, and the like.

Figure 5:
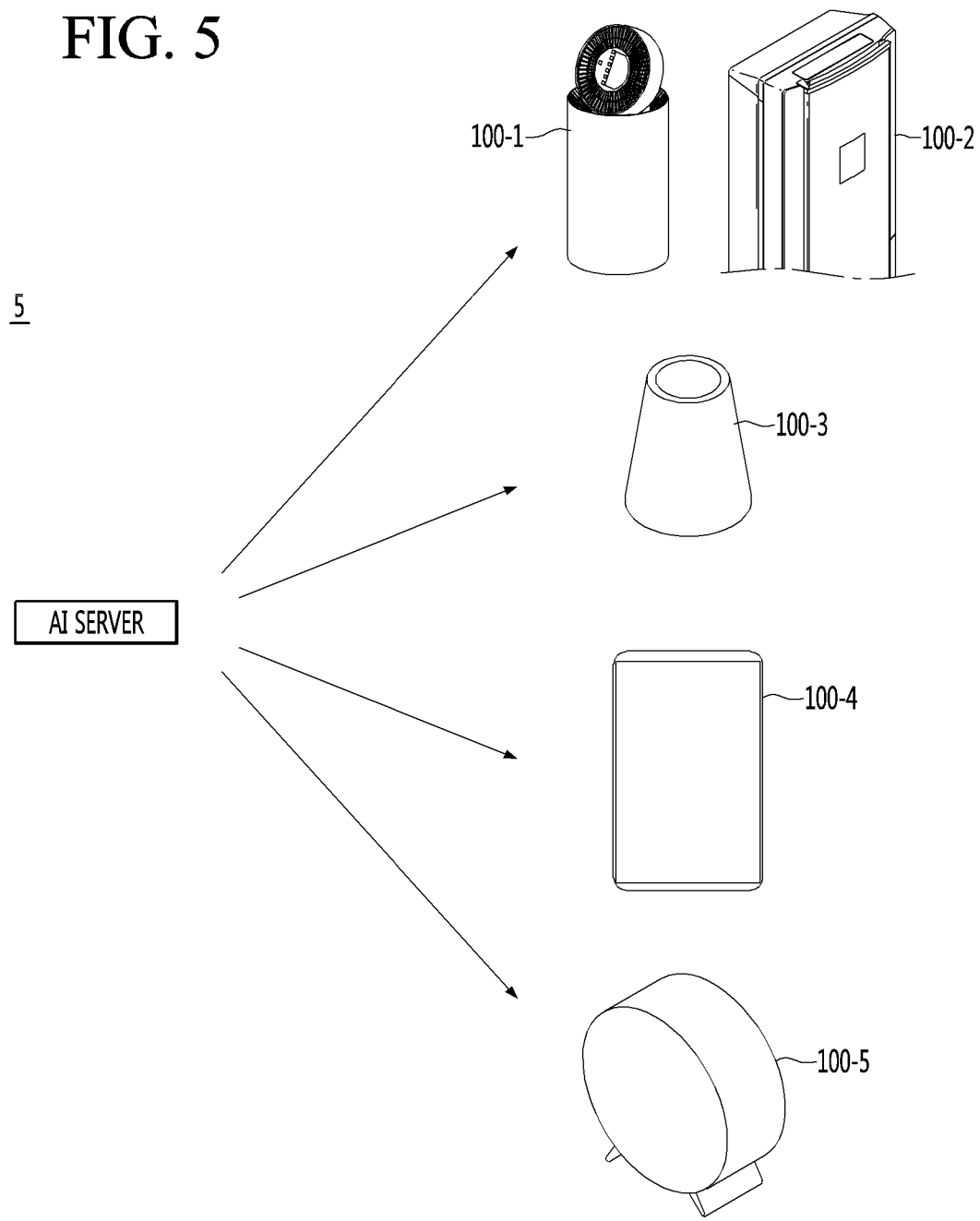
FIG. 5 is an overview illustrating an example of an artificial intelligence system according to another embodiment of the present invention.

Next, FIG. 5 is a view illustrating an example of an artificial intelligence system 5 according to another embodiment of the present invention. Referring to FIG. 5, the artificial intelligence system according to another embodiment of the present invention can include an AI server 200 and a plurality of artificial intelligence devices 100-1 to 100-5.

The first artificial intelligence device 100-1 can be an air purifier 100-1, the second artificial intelligence device 100-2 can be an air conditioner 100-2, the third artificial intelligence device 100-3 can be a voice agent device 100-3, the fourth artificial intelligence device 100-4 can be a mobile terminal 100-4, and the fifth artificial intelligence device 100-5 can be an air quality measurement device 100-5. Further, the air quality measurement device 100-5 may include one or more of a dust sensor, a temperature sensor or a humidity sensor.

The air quality measurement device 100-5 can also measure PM10, PM2.5, PM1.0, a temperature, humidity and the concentration of carbon dioxide in a house. The first to fifth artificial intelligence devices 100-1 to 100-5 shown in FIG. 5 can be provided in the house and may include all the components shown in FIG. 4.

In addition, the artificial intelligence system 5 can further include an IoT server for functioning as a relay between the AI server 200 and each artificial intelligence device. In more detail, the IoT server can enable communication between the AI server 200 and each artificial intelligence device.

Next, FIG. 6 is a ladder diagram illustrating a method of operating an artificial intelligence system according to an embodiment of the present invention. As shown, the processor 260 of the AI server 200 receives indoor air quality information and information on the air purifier 100-1 from the air purifier 100-1 through the communication unit 210 (S601).

The indoor air quality information may include one or more of the concentration of fine dust in a room, the concentration of ultrafine dust in a room or the concentration of carbon dioxide in a room. Further, the concentration of ultrafine dust may include the concentration of a volatile organic compound (Voc).

One or more dust sensors provided in the sensing unit 140 of the air purifier 100-1 can measure the concentration of fine dust, the concentration of ultrafine dust and the concentration of carbon dioxide in a room in which the air purifier 100-1 is disposed. The processor 180 of the air purifier 100-1 can then periodically transmit the indoor air quality information to the AI server 200. The period may be one hour but this is merely an example.

Further, the information on the air purifier 100-1 may include one or more of a model name of the air purifier 100-1, operation information of the air purifier 100-1, or a location of the air purifier 100-1. The operation information of the air purifier 100-1 may include functions of the air purifier 100-1 and information on operation modes capable of being performed by the air purifier 100-1.

According to another embodiment of the present invention, the AI server 200 can receive the indoor air quality information from the air quality measurement device 100-5. In particular, the air quality measurement device 100-5 can include a dust sensor and transmit the indoor air quality information measured through the dust sensor to the AI server 200.

Further, the processor 260 of the AI server 200 determines the operation state of the air purifier 100-1 based on the indoor air quality information and the information on the air purifier 100-1 (S603). In more detail, the processor 260 can determine the operation state of the air purifier 100-1 based on the indoor air quality information, the model name of the air purifier 100-1 and the operation information of the air purifier 100-1. Specifically, the processor 260 can determine the operation state of the air purifier 100-1 according to the concentration of the ultrafine dust in the room and the type of the air purifier 100-1.

In more detail, FIG. 7A is a table in which an operation state of an air purifier is mapped according to an air quality condition and the type of the air purifier according to an embodiment of the present invention. In addition, the table shown in FIG. 7A can be stored in the memory 230 of the AI server 200.

The air quality conditions may include a good condition, a normal condition, a bad condition and a worst condition (a very bad condition). First, the good condition can indicate a condition in which the concentration of the ultrafine dust is less than a first level, the normal condition can indicate a condition in which the concentration of the ultrafine dust is greater than the first level and is less than a second level, the bad condition can indicate a condition in which the concentration of the ultrafine dust is greater than the second level and is less than a third level, and the worst condition can indicate a condition that the concentration of the ultrafine dust is greater than the third level. The third level can be greater than the second level and the second level can be greater than the first level. Also, the type of the air purifier 100-1 can be classified according to the model name of the air purifier 100-1.

FIG. 7A shows a result of measuring the air quality condition based on the concentration of ultrafine dust having a diameter of 2.5 μm (PM 2.5) or less or ultrafine dust having a diameter of 1 μm (PM 1.0) or less. Assume that the model name of the air purifier 100-1 of FIG. 6 is Montblanc D.

The processor 260 can set the operation of the air purifier 100-1 to a clean booster mode and set an air volume to strong wind, when the indoor air quality condition is a bad condition. The processor 260 can also set the operation of the air purifier 100-1 to a clean booster mode, turn on left-and-right rotation, and set the air volume to power wind, when the air quality condition of the room is a very bad condition. Further, the air volume of the power wind can be greater than that of the strong wind. The processor 260 can also use operation information received from the air purifier 100-1, in order to determine the operation state of the air purifier 100-1.

Referring to FIG. 6 again, the processor 260 of the AI server 200 transmits a command for requesting the operation in the determined operation state to the air purifier 100-1 through the communication unit 210 (S605). In more detail, the operation state may include the operation mode of the air purifier 100-1, whether upward-and-downward rotation or left-and-right rotation of the air purifier 100-1 is turned on, and a set air volume.

The processor 180 of the air purifier 100-1 sets the operation of the air purifier 100-1 to the operation state corresponding to the command received from the AI server 200 (607). That is, the processor 180 of the air purifier 100-1 can set the operation state thereof according to the operation mode of the air purifier 100-1, the rotation direction and the air volume included in the received command.

Thereafter, the processor 180 of the air purifier 100-1 acquires an indoor air quality condition during a certain period (609). For example, the processor 180 of the air purifier 100-1 can acquire one or more of the concentration of the fine dust, the concentration of the ultrafine dust or the concentration of carbon dioxide through the dust sensor provided in the sensing unit 140.

Next, the processor 180 of the air purifier 100-1 determines whether the air quality condition of the room is a good condition based on the acquired indoor air quality condition (S611). In more detail, the processor 180 can determine that the indoor air quality condition is a good condition, when the concentration of the ultrafine dust measured in the room is less than the first level. The processor 180 of the air purifier 100-1 then sets the operation thereof to an operation state before the command is received from the AI server 200 (S613), when the air quality condition of the room is a good condition.

Further, the processor 180 can store the operation state in the memory 170, before the command including the operation state is received from the AI server 200. For example, when the operation mode before the command is received from the AI server 200 is an auto mode and the indoor air quality condition is changed to a good condition, the processor 180 can re-set the operation mode of the air purifier 100-1 to the auto mode.

According to the embodiment of the present invention, the appropriate operation state of the air purifier 100-1 can be automatically determined according to the indoor air quality information and the type of the air purifier 100-1, thereby greatly improving user convenience.

Figure 7B:
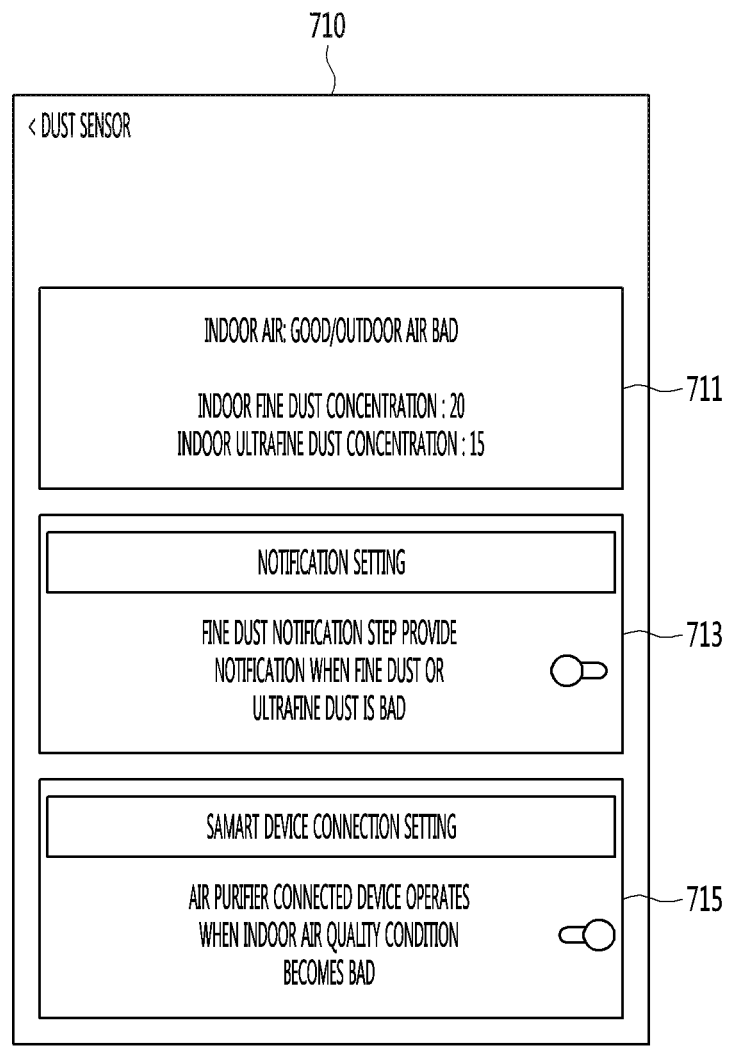
FIGS. 7B and 7C are overviews illustrating an interface screen for performing connection setting and operation setting between a mobile terminal and an air purifier through a fine dust notification application according to an embodiment of the present invention.
Figure 7C:
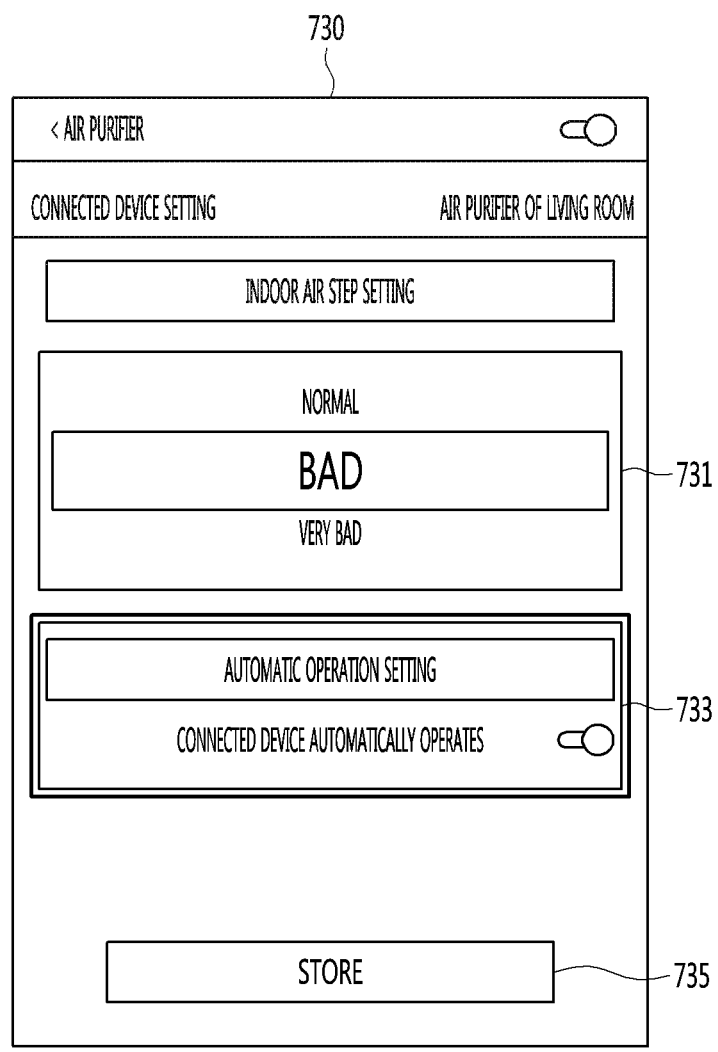

Next, FIGS. 7B and 7C are views illustrating an interface screen for performing a connection setting and an operation setting between a mobile terminal and an air purifier through a fine dust notification application according to an embodiment of the present invention. In more detail, the fine dust notification application can be installed in the mobile terminal 100-4. The fine dust notification application can provide a connection setting of the air purifier 100-1 and the air conditioner 100-2 provided in the house, information on indoor and outdoor fine dust, and fine dust management information.

FIG. 7B shows a connection setting screen 710 for setting a connection between the mobile terminal 100-4 and the air purifier 100-1. As shown, the connection setting screen 710 can include an air quality condition item 711, a notification setting item 713 and a device connection setting item 715.

The air quality condition item 711 can include an air quality condition measured through the dust sensor provided in the air purifier 100-1 and an outdoor air quality condition received from the AI server 200. Further, the notification setting item 713 can be an item for setting whether a notification will be provided when the condition of the fine dust is a bad condition or when the condition of the ultrafine dust is a bad condition. Also, the device connection setting item 715 can be an item for setting whether notification is provided indicating that a home appliance (e.g., the air purifier 100-1) connected to the mobile terminal 100-4 can operate, when the indoor air quality condition becomes a bad condition.

Next, FIG. 7C shows an operation setting screen 730 for setting the operation of the air purifier 100-1. As shown, the operation setting screen 730 can include an indoor air step setting item 731, an automatic operation setting item 733 and a storage item 735.

The indoor air step setting item 731 can be an item for setting the indoor air quality condition. In more detail, the indoor air quality condition can include a normal condition, a bad condition and a very bad condition. Further, the automatic operation setting item 733 can be an item for setting whether the air purifier 100-1 will be automatically turned on or off when reaching the set air quality condition.

When the air purifier 100-1 is set to be automatically turned on in the automatic operation setting item 733, the air purifier 100-1 can operate in the operation state set by the table of FIG. 7A. In addition, the storage item 735 can be an item for storing the settings of the indoor air step setting item 731 and the automatic operation setting item 733.

Figure 8:
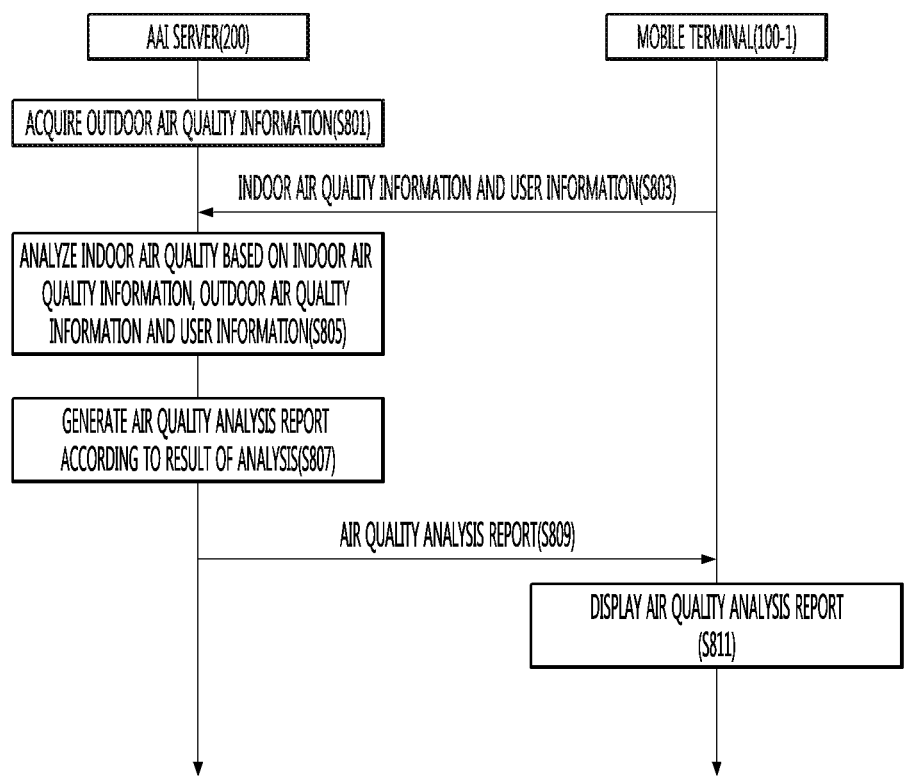
FIG. 8 is a ladder diagram illustrating a method of operating an artificial intelligence system according to another embodiment of the present invention.

Next, FIG. 8 is a ladder diagram illustrating a method of operating an artificial intelligence system according to another embodiment of the present invention. In particular, FIG. 8 relates to an embodiment in which a result of analyzing the indoor air quality at the AI server 200 is provided through the mobile terminal 100-4.

As shown, the processor 260 of the AI server 200 acquires outdoor air quality information (S801). The AI server 200 can receive the outdoor air quality information from an external server for providing weather information through the communication unit 210. In addition, the processor 260 of the AI server 200 receives the indoor air quality information and user information from the mobile terminal 100-4 through the communication unit 210 (S803).

Further, the indoor air quality information can be measured by any one of the air purifier 100-1, the air conditioner 100-2 or the air quality measurement device 100-5. The processor 180 of the mobile terminal 100-4 can also receive the indoor air quality information from any one of the air purifier 100-1, the air conditioner 100-2 or the air quality measurement device 100-5 and transmit the received indoor air quality information to the AI server 200.

The indoor air quality information may include one or more of the concentration of the fine dust in the room, the concentration of the ultrafine dust, a room temperature, humidity or the concentration of carbon dioxide. Further, the indoor air quality information may include one or more of the concentration of the fine dust or the concentration of the ultrafine dust measured by each of the plurality of air quality measurement devices respectively provided in a plurality of indoor spaces. Also, the plurality of indoor spaces can be spaces divided in the house, such as a living room, a kitchen and a main room.

In another example, the indoor air quality information can be directly transmitted from the air quality measurement device 100-5 to the AI server 200. Also, the user information may be meta information including one or more of personal information of a user and information on a house where the user lives. In addition, the meta information may include the residential type of the user, whether the user's house is located on the side of a road or inside the road, the location of the air quality measurement device 100-5, etc.

Further, the processor 260 of the AI server 200 analyzes indoor air quality based on the outdoor air quality information, the indoor air quality information and the user information (S805). Further, the processor 260 of the AI server 200 generates an air quality analysis report according to the result of analysis (S807), and transmits the generated air quality analysis report to the mobile terminal 100-4 through the communication unit 210 (S809). The air quality analysis report includes, for example, a report on the analysis of the detailed indoor air quality condition based on the outdoor air quality information, the indoor air quality information and the user information collected during a certain period. The processor 180 of the mobile terminal 100-4 then displays the air quality analysis report through the display unit 152 (S811).

Figure 9:
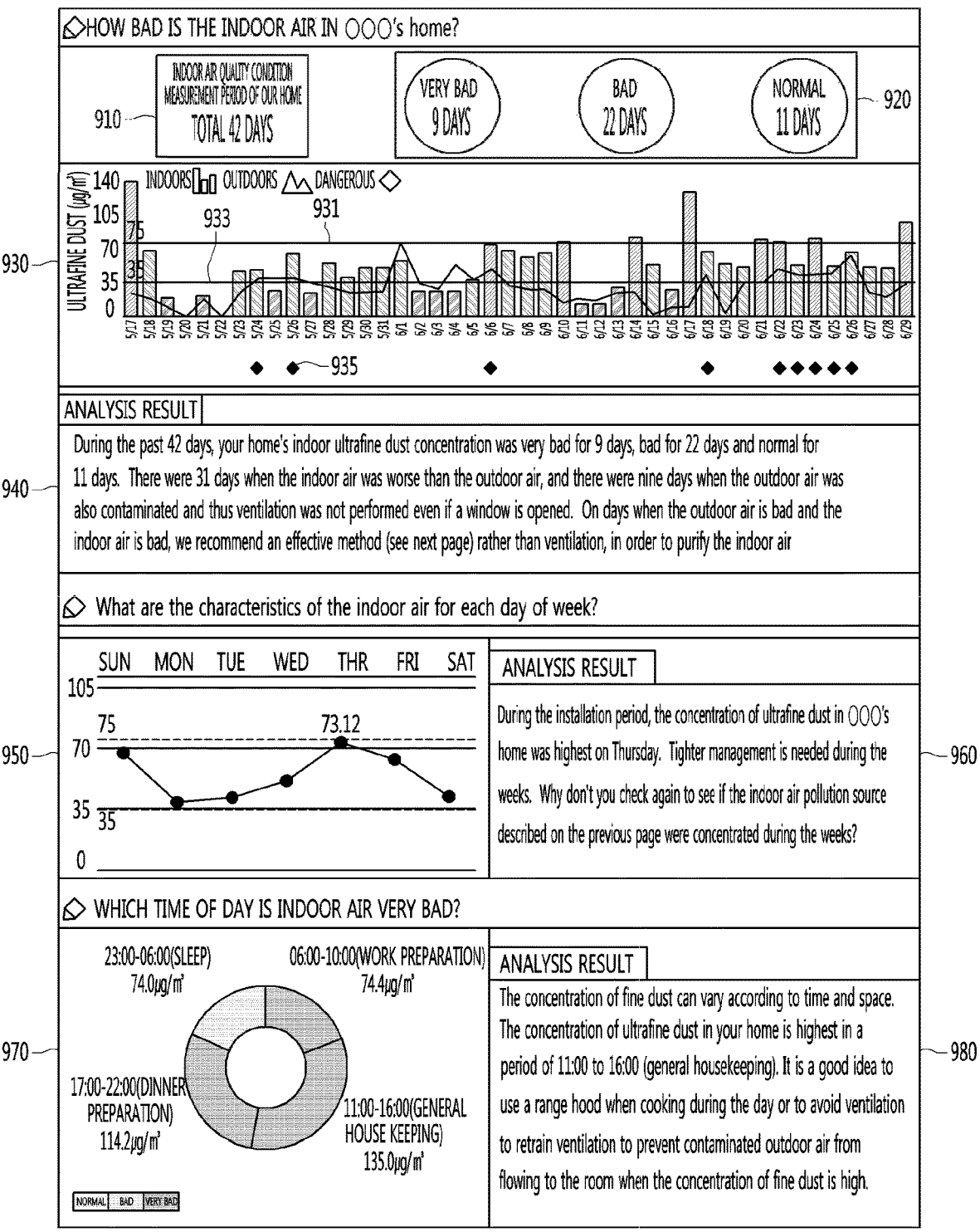

The air quality analysis report will be described in more detail below. In particular, FIGS. 9 and 10 are views illustrating air quality analysis reports according to an embodiment of the present invention. FIGS. 9 and 10 respectively show a first analysis report 900 and a second analysis report 1000 indicating the result of analyzing the indoor air quality. In addition, the air quality analysis report can include a cover, basic content of ultrafine dust and article about danger and the first and second analysis reports 900 and 1000.

First, FIG. 9 will be described. Referring to FIG. 9, the first analysis report 900 may include one or more of an indoor air quality condition measurement period item 910, a daily indoor air quality condition item 920, a daily ultrafine dust concentration item 930, an indoor air quality analysis result item 940, a day-of-week ultrafine dust concentration item 950, a day-of-week analysis result item 960, a time-of-day ultrafine dust concentration item 970 or a time-of-day analysis result item 980.

The indoor air quality condition measurement period item 910 may indicate a measurement period in which the indoor air quality condition of the house is measured. The measurement period may be a period from a time point when the air quality measurement device 100-5 is installed in the house to a time pint of recovery. In another example, the measurement period may be a period from a date when the fine dust notification application is installed in the mobile terminal 100-4 to a time point when measurement of indoor air quality is finished.

Further, the fine dust notification application can provide information on the indoor fine dust of the house, the daily indoor air quality condition item 920 can indicate the number of days according to the air quality condition, and the air quality condition can include a very bad condition (a worst condition), a bad condition and a normal condition. When the measurement period is 42 days, the number of days classified as the very bad condition may be 9, the number of days classified as the bad condition may be 22, and the number of days classified as the normal condition may be 11.

The color of the air quality condition may vary according to the number of days. The air quality condition may be classified as the normal condition when the representative value of the concentration of the ultrafine dust measured in the room is equal to or less than 35 $\mu g/m^3$, classified as the bad condition when the representative value of the concentration of the ultrafine dust measured in the room is from 36 $\mu g/m^3$ to 75 $\mu g/m^3$, and classified as the very bad condition when the representative value of the concentration of the ultrafine dust measured in the room is equal to or greater than 76 $\mu g/m^3$.

The representative value of the indoor concentration of the ultrafine dust can be expressed by Equation 1 below.

$$\{\text{Max (hourly indoor PM2.5 average)} + \text{Min (hourly indoor PM2.5 average)}\}/2 \quad \text{Equation 1}$$

In another example, the representative value of the indoor concentration of the ultrafine dust can be a maximum of the hourly average. The daily ultrafine dust concentration item 930 can also indicate the value of the concentration of the ultrafine dust for each day configuring the measurement period in a bar graph.

Further, the daily ultrafine dust concentration item 930 can include one or more of the value of the indoor or outdoor concentration of ultrafine dust. In the representative value of the outdoor concentration of ultrafine dust, the calculation method of the representative value of the indoor concentration of ultrafine dust can be used.

Each bar may be displayed in green when the representative value of the indoor concentration of ultrafine dust belongs to the normal condition, displayed in orange when the representative value of the indoor concentration of ultrafine dust belongs to the bad condition, and displayed in red when the representative value of the indoor concentration of ultrafine dust belongs to the very bad condition. The daily ultrafine dust concentration item 930 can include a first reference line 931 indicating 75 $\mu g/m^3$ which is a criterion for distinguishing between the very bad condition and the bad condition and a second reference line 933 indicating 35 $\mu g/m^3$ which is a criterion for distinguishing between the normal condition and the bad condition.

The daily ultrafine dust concentration item 930 can further include an indicator 935 indicating a dangerous condition when the outdoor concentration of ultrafine dust is equal to or greater than 35 $\mu g/m^3$ and the indoor concentration of ultrafine dust is higher than the outdoor concentration of ultrafine dust. This means that, since the indoor air quality condition is bad and thus ventilation is required but the outdoor air quality condition is not good, it is more efficient that the fine dust management device such as an air purifier is used rather than opening a window.

Further, the indoor air quality analysis result item 940 can provide the result of analyzing the daily ultrafine dust concentration item 930 in text. The day-of-week ultrafine dust concentration item 950 can provide change in the concentration of the ultrafine dust for each day of week during the measurement period in the form of a graph. The daily representative value can be obtained through the day-of-week average value after calculating the representative value based on the hourly average value of the indoor concentration of PM 2.5.

Further, the day-of-week ultrafine dust concentration item 950 can include a third reference line 951 indicating 75 $\mu g/m^3$ which is a criterion for distinguishing between the very bad condition and the bad condition and a fourth reference line 953 indicating 35 $\mu g/m^3$ which is a criterion for distinguishing between the normal condition and the bad condition. The day-of-week analysis result item 960 can provide the result of analyzing the day-of-week ultrafine dust concentration item 950 in text, and may include the analysis results of weekdays and weekends.

In addition, the time-of-day ultrafine dust concentration item 970 can show the indoor air quality condition in each of a plurality of time intervals during the measurement period. For example, the time-of-day ultrafine dust concentration item 970 can be divided into four time intervals to show the indoor air quality conditions. The four time intervals can include a work preparation interval, a general housekeeping interval, a dinner preparation interval and a bedtime interval. The mobile terminal 100-4 can calculate the representative value of each time interval through Equation 2 below.

$$\{\text{Max (hourly indoor PM2.5 average of each time interval)} + \text{Min (hourly indoor PM2.5 average of each time interval)}\}/2 \quad \text{Equation 2}$$

In the above embodiment, the number of time intervals is 4 but this is merely an example. Further, the time-of-day analysis result item 980 can provide the result of analyzing the time-of-day ultrafine dust concentration item 970 in text, and may include an air quality condition in each of the plurality of time intervals and a user guide for fine dust management.

In addition, according to another embodiment of the present invention, the items configuring the first analysis report 900 can be provided with respect to each of the divided spaces of the house. For example, the first analysis report 900 can be provided with respect to each of the spaces such as a living room, a kitchen and a bedroom. In this instance, the dust sensor for measuring the concentration of ultrafine dust can be provided in each of the living room, the kitchen and the bedroom.

Next, FIG. 10 will be described. Referring to FIG. 10, the second analysis report 1000 can include one or more of a first air quality comparison item 1010, a second air quality comparison item 1020, an air quality comparison analysis item 1030, an air quality type item 1040, an air quality type analysis item 1050 or a solution proposal item 1060.

The first air quality comparison item 1010 and the second air quality comparison item 1020 can compare the air quality conditions of a user's house and another house. In addition, the first air quality comparison item 1010 and the second air quality comparison item 1020 can be generated based on meta information previously input through the fine dust notification application.

Further, the meta information can include a user's residential type (apartment or detached house) and a residential location (on the side of a road or inside a road). The mobile terminal 100-4 can receive the air quality condition of a house having the same meta information as the input meta information from the AI server 200.

The representative value of the indoor concentration of ultrafine dust of the user's house during the measurement period is required to compare the air quality condition of the user's house with the air quality condition of another house. As described with reference to FIG. 9, the representative value can be first calculated. Thereafter, the mobile terminal 100-4 can acquire the representative value of the indoor concentration of the ultrafine dust of each house by dividing the sum of the representative values by the measurement period.

In addition, the representative value of the concentration of the ultrafine dust of another apartment-type house can be an average value of the representative values collected from users living in the apartment-type houses. The representative value of the concentration of the ultrafine dust of another house located far from a road can be an average value of the representative values collected from users living in the houses located far from the road.

Further, the meta information used in the first and second air quality comparison items 1010 and 1020 are merely examples and have various analysis types such as a house with children/a house without children or a house located on a low floor/middle floor/high floor. In the second air quality comparison item 1020, the representative value of the air quality of a neighboring house can be obtained with respect to each of a plurality of spaces configuring the neighboring house. The dust sensor is provided in each of the plurality of spaces and the concentration of the ultrafine dust can be measured based on the location of the dust sensor.

The air quality comparison analysis item 1030 can provide the result of analyzing comparison with the air quality condition of another house having the same meta information in text. Text can be changed depending on whether the representative value of the concentration of the ultrafine dust is greater than that of the neighboring house.

The air quality type item 1040 can provide the type of the indoor air quality of the house according to comparison between the indoor air quality condition and the outdoor air quality condition. The air quality type can be divided into four types according to the indoor air quality condition and the outdoor air quality condition.

Further, the first air quality type is a type in which the average value (based on the measure period) of the representative values of the indoor concentration of the ultrafine dust exceeds 35 $\mu g/m^3$ and the average value of the representative values of the outdoor concentration of the ultrafine dust exceeds 35 $\mu g/m^3$. The second air quality type is a type in which the average value (based on the measure period) of the representative values of the indoor concentration of the ultrafine dust exceeds 35 $\mu g/m^3$ and the average value of the representative values of the outdoor concentration of the ultrafine dust is equal to or less than 35 $\mu g/m^3$.

The third air quality type is a type in which the average value (based on the measure period) of the representative values of the indoor concentration of the ultrafine dust is equal to or less than 35 $\mu g/m^3$ and the average value of the representative values of the outdoor concentration of the ultrafine dust exceeds 35 $\mu g/m^3$. The fourth air quality type is a type in which the average value (based on the measure period) of the representative values of the indoor concentration of the ultrafine dust is equal to or less than 35 $\mu g/m^3$ and the average value of the representative values of the outdoor concentration of the ultrafine dust is equal to or less than 35 $\mu g/m^3$.

Further, the mobile terminal 100-4 can determine any one of the plurality of air quality types according to the average values of the indoor and outdoor concentrations of the ultrafine dust. The air quality type analysis item 1050 can provide the detailed description of the air quality type item 1040 in text. The air quality type analysis item 1050 can include text corresponding to the actually determined air quality type item 1040. This will be described with reference to FIG. 11.

FIG. 11 is a view illustrating text provided in correspondence with each of a plurality of air quality types according to an embodiment of the present invention. Referring to FIG. 11, text corresponding to each of the four air quality types is shown. The mobile terminal 100-4 can provide text corresponding to the determined air quality type through the air quality type analysis item 1050.

FIG. 10 will be described again. As shown, the solution proposal item 1060 recommends a fine dust management solution suiting the determined air quality type. The solution proposal item 1060 can include the model of an air purifier suiting the determined air quality type or the model of a home appliance related thereto.

Figure 12:
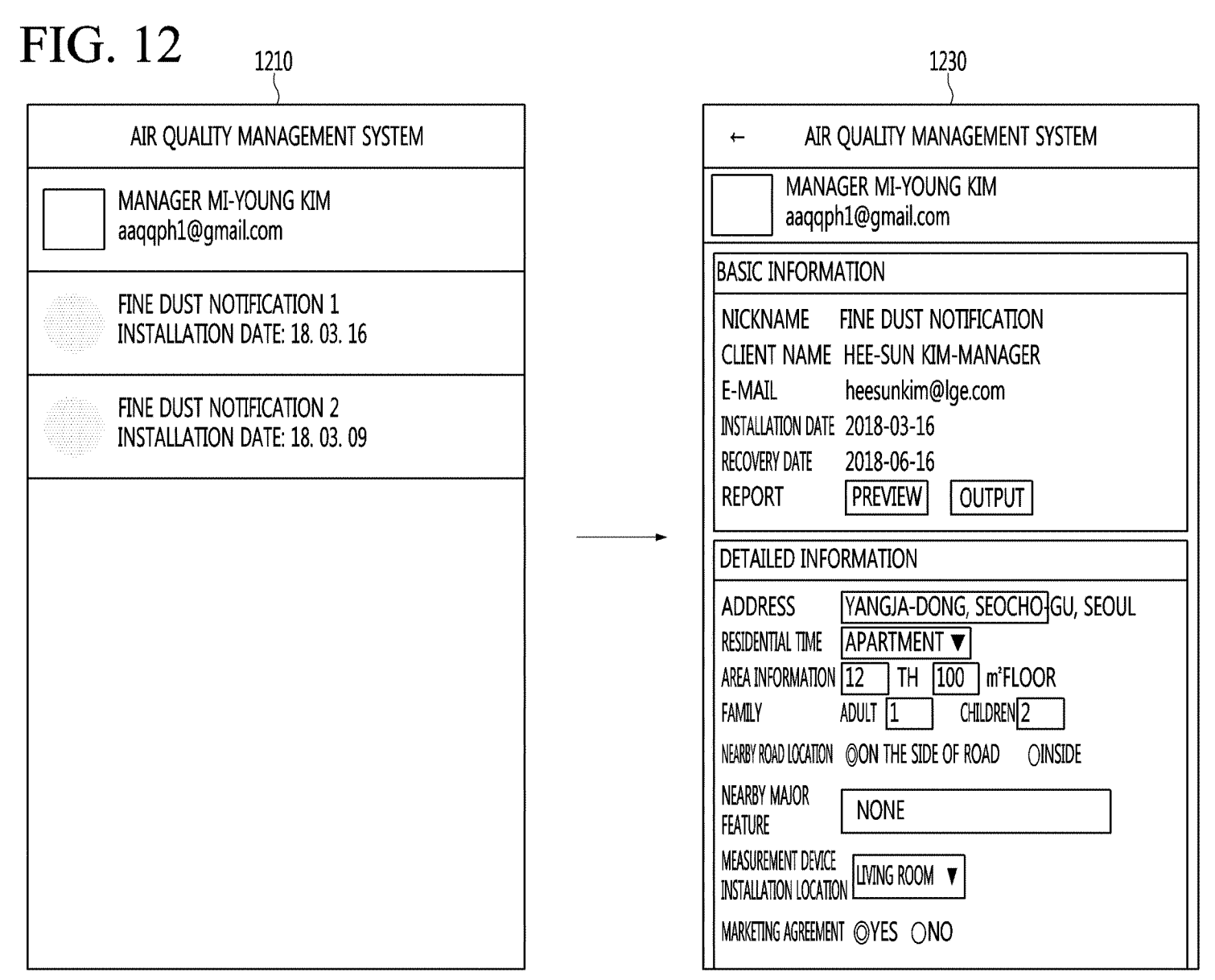

FIG. 12 is a view showing a process of receiving meta information of a client necessary to provide an air quality analysis report according to an embodiment of the present invention. Each of the screens of FIG. 12 is an interface screen displayed through the display of the mobile terminal of a manager for managing fine dust.

Further, the manager screen 1210 of FIG. 12 can be a management screen visible to the manager who manages the fine dust of the house. When an item for managing the meta information of the client is selected through the manager screen 1210, a meta information input screen 1230 can be displayed. The meta information input screen 1230 is a screen on which the meta information of a specific client is input by the manager.

The meta information of the client can include an installation date of the dust sensor or the air purifier, a recovery date of the dust sensor or the air cleaner, the residential type of the client, the personal information of the client, the installation location of the dust sensor or the air purifier, whether the house of the client is on the side of a road or inside of the road. The meta information of the client can be used to provide the air quality analysis report described with reference to FIGS. 9 and 10.

FIG. 13 is a view showing an air quality service screen according to an embodiment of the present invention. The air quality service screen of FIG. 13 can be another form of the air quality analysis report. The air quality service screen can include outdoor air quality information 1310, air quality information 1330 of a specific space of a house and an air quality management guide 1350.

The outdoor air quality information 1310 can include information indicating outdoor air quality. The air quality information 1330 of the specific space of the house can include information on the air quality measured in the specific space. The specific space can be a space where the air quality measurement device 100-5 is installed. The air quality management guide 1350 can include text for air quality management suiting the air quality information 1330 of the specific space.

FIG. 14 is a view illustrating an air quality guide table in which guides are mapped according to air quality according to an embodiment of the present invention. The air quality guide table 1400 shown in FIG. 14 can be stored in the memory 230 of the AI server 200, the memory 170 of the voice agent device 100-3, the memory 170 of the mobile terminal 100-4, and the air quality measurement device 100-5.

The air quality guide table can indicate guides according to the outdoor air quality condition and the indoor air quality condition. The processor 180 of the mobile terminal 100-4 can extract a guide corresponding to the outdoor air quality condition and the indoor air quality condition from the air quality guide table 1400.

Further, the processor 180 of the mobile terminal 100-4 can audibly output the extracted guide through a speaker. The processor 180 of the mobile terminal 100-4 can audibly output a text guide using a text-to-speech conversion engine. In another example, the voice agent device 100-3 or the air quality measurement device 100-5 can extract a guide according to the outdoor air quality condition and the indoor air quality condition and audibly output the extracted guide.

Figure 15A:
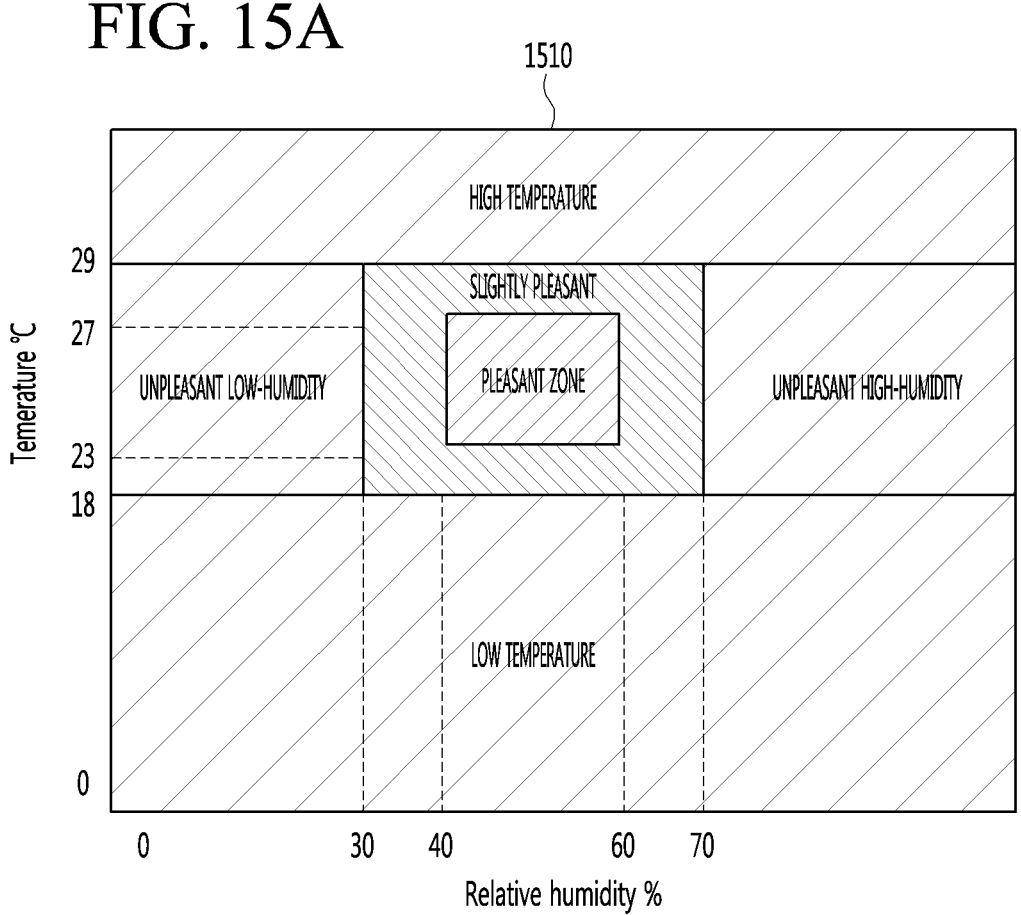

FIGS. 15A and 15B are views illustrating guides according to a temperature and humidity measured in a house according to an embodiment of the present invention. The internal temperature and humidity of the house can be measured by the temperature sensor and the humidity sensor provided in any one of the air purifier 100-1, the air conditioner 100-2 or the air quality measurement device 100-5.

Referring to FIG. 15A, a comfort state diagram 1510 according to the humidity and the temperature is shown. The comfort state diagram can be classified according to comfort. The comport can include a pleasant state, a slightly pleasant state, a low temperature state, an unpleasant low-humidity state, an unpleasant high-humidity state, and a high temperature state.

The states indicating the comfort can have different colors. The mobile terminal 100-4 can determine the internal comfort of the house based on the temperature and humidity measured in the house. The mobile terminal 100-4 can receive the temperature and the humidity from any one of the air purifier 100-1, the air conditioner 100-2 or the air quality measurement device 100-5. The mobile terminal 100-4 can display the guide corresponding to the determined comfort in text or audibly output the guide.

Referring to FIG. 15B, a comfort guide 1530 indicating the guide according to the comfort is shown. The comfort guide 1530 can be stored in the memory 170. The mobile terminal 100-4 can determine the comfort according to the temperature and the humidity and extract a guide corresponding to the determined comfort from the comfort table 1530.

The mobile terminal 100-4 can display the extracted guide in text or audibly output the extracted guide.

According to various embodiments of the present invention, a user can receive feedback and guide to an indoor air quality condition, thereby appropriately coping with the air quality condition. Therefore, the indoor air quality condition of the user is improved, thereby optimizing the respiratory health of the user.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer can include the controller 180 of the AI device.

What is claimed is:

1. An artificial intelligence (AI) device, comprising:
a display configured to display a meta information screen for inputting meta information about a building;
a communication processor configured to:
communicate with an air quality measurement device located inside of the building to retrieve indoor air quality information about a quality of air inside the building,
transmit the indoor air quality information and the input meta information to an AI server, wherein the AI server acquires outdoor air quality information about a quality of air outside the building; and
a processor configured to:
control the display to display a first air quality analysis report screen for a particular measurement period of the air quality measurement device measuring the quality of the air inside the building, wherein the first air quality analysis report screen includes an analyzed condition of the indoor air quality based on the indoor air quality information, the meta information and the outdoor air quality information, and
control the display to display a second air quality analysis report screen based on the analysis of the indoor air quality information, the meta information and the outdoor air quality information, wherein the second air quality analysis report screen includes an air quality type according to the quality of the air inside the building and a solution for fine dust management according to the quality of the air inside the building,
wherein the meta information includes a residential type of the building, whether the building is on the side of a road, and an installation date and recovery date of the air quality measurement device, and
the second air quality analysis report screen further includes:
an air quality comparison item including a result of comparing the indoor air quality condition with an indoor air quality condition of another house which has the same meta information based on the analysis of the indoor air quality information, the meta information and the outdoor air quality information.

2. The AI device of claim 1, wherein the first air quality analysis report screen includes one or more of:
a daily indoor air quality condition item indicating a number of the days of the particular measurement period and the condition of the indoor air quality for the number of days,
a daily ultrafine dust concentration item indicating a value of a concentration of ultrafine dust for each day during the particular measurement period in a graph,
a day-of-week ultrafine dust concentration item indicating a change in the concentration of ultrafine dust for each day of the week during the particular measurement period, and
a time-of-day ultrafine dust concentration item showing the condition of the indoor air quality for each time of day in each of a plurality of time intervals during the particular measurement period.

3. The AI device of claim 2, wherein the condition of the indoor air quality is reported as any one of a normal condition, a bad condition or a very bad condition, and
wherein the normal condition indicates a condition in which a representative value of the concentration of the ultrafine dust is less than a first value, the bad condition indicates a condition in which the representative value of the concentration of the ultrafine dust is less than a second value greater than the first value, and the very bad condition indicates a condition in which the representative value of the concentration of the ultrafine dust is equal to or greater than the second value.

4. The AI device of claim 3, wherein the representative value of the concentration of the ultrafine dust is calculated by Equation 1 below:

{Max (hourly indoor PM2.5 average)+Min (hourly indoor PM2.5 average)}/2     Equation 1.

5. The AI device of claim 3, wherein the representative value of the ultrafine dust in each of the plurality of time intervals is calculated by Equation 2 below:

{Max (hourly indoor PM2.5 average of each time interval)+Min (hourly indoor PM2.5 average of each time interval)}/2     Equation 2.

6. The AI device of claim 1, wherein the indoor air quality information includes one or more of a concentration of fine dust, a concentration of ultrafine dust, a temperature, humidity or a concentration of carbon dioxide measured in a house.

7. The AI device of claim 1, wherein the indoor air quality information includes one or more of a concentration of fine dust or a concentration of ultrafine dust measured in each of a plurality of air quality measurement devices respectively disposed in a plurality of indoor spaces in the building.

8. The AI device of claim 1, wherein the AI device comprises a mobile terminal.

9. An artificial intelligence (AI) system, comprising:
an air quality measurement device located inside of a building and configured to measure indoor air quality information about a quality of air inside the building;
an AI device configured to acquire meta information about the building; and
an AI server configured to:
acquire outdoor air quality information about a quality of air outside the building,
receive the indoor air quality information from the air quality measurement device, and the meta information from the AI device,
generate a first air quality analysis report for a particular measurement period of the air quality measurement device measuring the quality of the air inside the building, wherein the first air quality analysis report includes an analyzed condition of the indoor air quality based on the indoor air quality information, the meta information and the outdoor air quality information,
generate a second air quality analysis report based on the analysis of the indoor air quality information, the meta information and the outdoor air quality information, wherein the second air quality analysis report includes an air quality type according to the quality of the air inside the building and a solution for fine dust management according to the quality of the air inside the building, and
transmit the generated first and second air quality analysis reports to the AI device via a communication processor included in the AI device, wherein the meta information includes a residential type of the building, whether the building is on the side of a road, and an installation date and recovery date of the air quality measurement device, and
wherein the second air quality analysis report screen further includes:
an air quality comparison item including a result of comparing the indoor air quality condition with an indoor air quality condition of another house which has the same meta information based on the analysis of the indoor air quality information, the meta information and the outdoor air quality information.

10. The AI system of claim 9, wherein the first air quality analysis report includes one or more of:
a daily indoor air quality condition item indicating a number of the days of the particular measurement period and the condition of the indoor air quality for the number of days,
a daily ultrafine dust concentration item indicating a value of a concentration of ultrafine dust for each day during the particular measurement period in a graph,
a day-of-week ultrafine dust concentration item indicating a change in the concentration of ultrafine dust for each day of the week during the particular measurement period, and
a time-of-day ultrafine dust concentration item showing the condition of the indoor air quality for each time of day in each of a plurality of time intervals during the particular measurement period.

11. The AI system of claim 10, wherein the condition of the indoor air quality is reported as any one of a normal condition, a bad condition or a very bad condition, and
wherein the normal condition indicates a condition in which a representative value of the concentration of the ultrafine dust is less than a first value, the bad condition indicates a condition in which the representative value of the concentration of the ultrafine dust is less than a second value greater than the first value, and the very bad condition indicates a condition in which the representative value of the concentration of the ultrafine dust is equal to or greater than the second value.

12. The AI system of claim 11, wherein the representative value of the concentration of the ultrafine dust is calculated by Equation 1 below:

{Max (hourly indoor PM2.5 average)+Min (hourly indoor PM2.5 average)}/2     Equation 1.

13. The AI system of claim 11, wherein the representative value of the ultrafine dust in each of the plurality of time intervals is calculated by Equation 2 below:

{Max (hourly indoor PM2.5 average of each time interval)+Min (hourly indoor PM2.5 average of each time interval)}/2     Equation 2.

14. The AI system of claim 9, wherein the indoor air quality information includes one or more of a concentration of fine dust, a concentration of ultrafine dust, a temperature, humidity or a concentration of carbon dioxide measured in a house.

15. The AI system of claim 9, wherein the indoor air quality information includes one or more of a concentration of fine dust or a concentration of ultrafine dust measured in each of a plurality of air quality measurement devices respectively disposed in a plurality of indoor spaces.

* * * * *